United States Patent
Heger et al.

(10) Patent No.: US 10,683,884 B2
(45) Date of Patent: Jun. 16, 2020

(54) SEMI-TUBULAR SELF-PIERCING RIVET FOR THIN SHEET METAL JOINTS, METHOD FOR PRODUCING SAID SEMI-TUBULAR SELF-PIERCING RIVET, AND METHOD FOR PRODUCING A JOINT

(71) Applicant: BÖLLHOFF VERBINDUNGSTECHNIK GmbH, Bielefeld (DE)

(72) Inventors: Mathias Heger, Oerlinghausen (DE); Dennis Henke, Rheda-Wiedenbrück (DE); Daniel Junklewitz, Paderborn (DE); Andreas Marxkors, Hövelhof (DE); Franz Ferdinand Menne, Bad Lippspringe (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 278 days.

(21) Appl. No.: 15/771,805

(22) PCT Filed: Oct. 17, 2016

(86) PCT No.: PCT/EP2016/074849
§ 371 (c)(1),
(2) Date: Apr. 27, 2018

(87) PCT Pub. No.: WO2017/076619
PCT Pub. Date: May 11, 2017

(65) Prior Publication Data
US 2018/0266465 A1    Sep. 20, 2018

(30) Foreign Application Priority Data
Nov. 4, 2015 (DE) .......................... 10 2015 118 888

(51) Int. Cl.
*F16B 19/08* (2006.01)
*B21J 15/02* (2006.01)
*F16B 5/04* (2006.01)

(52) U.S. Cl.
CPC .......... *F16B 19/086* (2013.01); *B21J 15/025* (2013.01); *F16B 5/04* (2013.01); *F16B 19/08* (2013.01)

(58) Field of Classification Search
CPC .. F16B 5/04; F16B 19/04; F16B 19/08; F16B 19/086; F16B 21/00; B21J 15/025; Y10T 29/49943; Y10T 29/49956
(Continued)

(56) References Cited

U.S. PATENT DOCUMENTS 6,663,329 B2 * 12/2003 Singh ..................... B21J 15/025
411/501
7,628,573 B2    12/2009 Philipskotter
(Continued)

FOREIGN PATENT DOCUMENTS

CN    103008523 A    4/2013
DE    19648231 A1    5/1998
(Continued)

OTHER PUBLICATIONS

English translation of the International Preliminary Report on Patentability for PCT/EP2016/074849 dated May 8, 2018, (12 pages).

(Continued)

*Primary Examiner* — Roberta S Delisle
(74) *Attorney, Agent, or Firm* — Reising Ethington P.C.

(57) ABSTRACT

A semi-tubular self-piercing rivet having a rivet head and a rivet shaft, the shaft bore of which satisfies the following relationship in relation to the length of the semi-tubular self-piercing rivet:

(Continued)

$$0.4 \leq \frac{T_B}{L_N} \leq 0.6,$$

Figure 1:
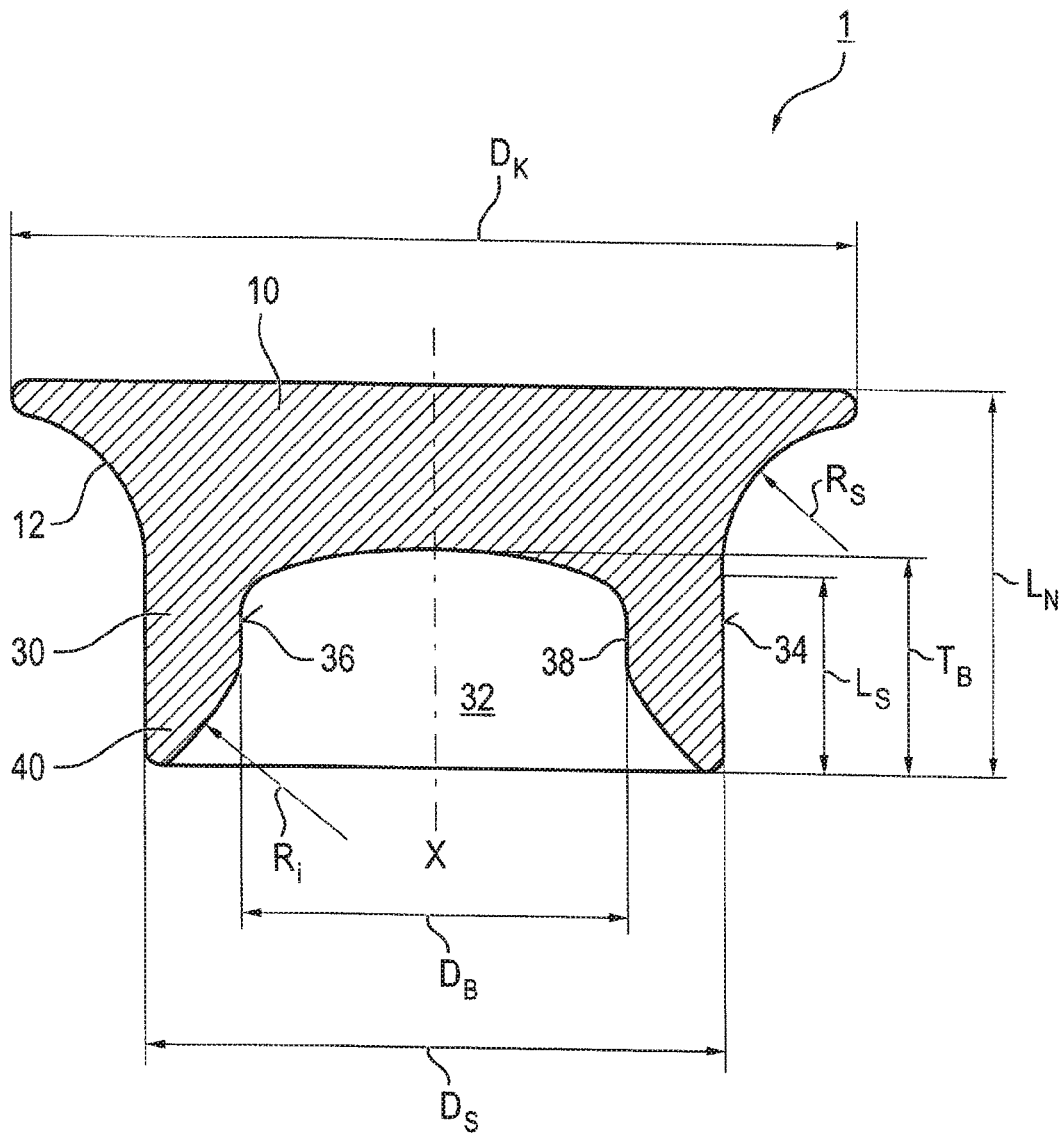

the total length of the self-piercing rivet $L_N$ being $\leq 4$ mm. The disclosure further relates to a corresponding self-piercing rivet joint, to a method for producing the self-piercing rivet, and to a method for producing the self-piercing rivet joint.

22 Claims, 6 Drawing Sheets

(58) Field of Classification Search
USPC .......................................... 411/500, 501, 506
See application file for complete search history.

(56) References Cited

U.S. PATENT DOCUMENTS

| | | | |
|---|---|---|---|
| 7,762,753 B2* | 7/2010 | Jokisch | F16B 19/086 411/179 |
| 8,506,228 B2 | 8/2013 | Singh et al. | |
| 9,091,290 B2 | 7/2015 | Singh et al. | |
| 9,803,675 B2 | 10/2017 | Hofmann et al. | |
| 9,919,356 B2 | 3/2018 | Bartig et al. | |
| 2003/0175095 A1 | 9/2003 | Clarke | |
| 2004/0068854 A1 | 4/2004 | Kato et al. | |
| 2009/0116934 A1 | 5/2009 | Trinick | |
| 2009/0269165 A1* | 10/2009 | Fujii | F16B 5/04 411/503 |
| 2013/0336745 A1* | 12/2013 | Trinick | F16B 5/04 411/501 |
| 2014/0248105 A1* | 9/2014 | Nannekawa | A47G 1/22 411/500 |
| 2018/0045237 A1 | 2/2018 | Hofmann et al. | |

FOREIGN PATENT DOCUMENTS

| | | |
|---|---|---|
| DE | 20319610 U1 | 3/2004 |
| DE | 60115059 T2 | 8/2006 |
| DE | 102005052360 A1 | 5/2007 |
| DE | 102006028537 B3 | 5/2007 |
| DE | 102012013829 A1 | 1/2014 |
| DE | 102013020504 A1 | 6/2015 |
| EP | 0833063 A1 | 4/1998 |
| EP | 1387093 A1 | 2/2004 |
| WO | WO2007132194 A1 | 11/2007 |

OTHER PUBLICATIONS

Office Action for CN Application No. 201680064468.4 dated May 30, 2019 (10 pages).

Written Opinion & International Search Report for PCT/EP2016/074849 dated Jan. 23, 2017, 13 pages.

* cited by examiner

SEMI-TUBULAR SELF-PIERCING RIVET FOR THIN SHEET METAL JOINTS, METHOD FOR PRODUCING SAID SEMI-TUBULAR SELF-PIERCING RIVET, AND METHOD FOR PRODUCING A JOINT

1. TECHNICAL FIELD

The present disclosure relates to a semi-hollow self-piercing rivet which is particularly configured for the manufacturing of thin sheet metal joints. Further, the present disclosure relates to a joint of thin components with said semi-hollow self-piercing rivet, a manufacturing method for said joint as well as a manufacturing method for the above-mentioned semi-hollow self-piercing rivet.

2. BACKGROUND

Conventional semi-hollow self-piercing rivets are known in the prior art, as described, for example, in DE 10 2006 028 537 B3 and in DE 10 2005 052 360 A1. The known semi-hollow self-piercing rivets have a rivet shaft with a central shaft bore, which extends for the most part over more than 80% of the total length of the semi-hollow self-piercing rivet in the direction of the rivet head. Such self-piercing rivet geometries are, due to their length and due to the spreading behavior of the classic semi-hollow self-piercing rivets alone not suitable for a manufacturing of thin sheet metal joints.

DE 196 48 231 A1 describes a method for influencing the spreading behavior of a semi-hollow self-piercing rivet driven into a component. In order to influence the spreading of the semi-hollow self-piercing rivet during the joining process, the central shaft bore is completely or partially filled with a substance which acts hydrostatically during the riveting process. These hydrostatically acting substances are materials whose state of aggregation is solid at normal room and transport temperatures, but can be quickly converted into a liquid or pasty state of aggregation during processing. Depending on the degree of filling of the central shaft bore of the rivet shaft, the beginning of the spreading process of the rivet shaft is variable. Admittedly, in the presence of a filling substance in the shaft cavity, a broadening process of the rivet shaft takes place earlier than in the case of a spreading which is initiated exclusively by the action of a die or additionally by a sharpened rivet foot geometry. However, an adjustment of the spreading behavior by filling the central shaft bore of the semi-hollow rivet is not reliable in order to adjust the semi-hollow self-piercing rivet to different thicknesses and materials of a thin sheet metal joint to be manufactured.

For producing a self-piercing rivet joint in aluminum sheets, EP 0 833 063 A1 describes the use of a semi-hollow rivet, which consists of light metal. In particular, the light metal semi-hollow rivet comprises a blunt cutting edge and a conical cavity in the rivet shaft.

In order to achieve an advantageous spreading of the semi-hollow rivet during the joining process, the total rivet length of the light metal semi-hollow rivet meets the ratio 5:3 to the maximum shaft cavity length. This ratio was precisely chosen because, after piercing the upper aluminum sheet, the rivet shaft of the semi-hollow rivet does not spread sufficiently when the shaft cavity length is lower. If, however, the shaft cavity length is larger, this affects the riveting of the upper aluminum sheet. Furthermore, the tapered shape of the shaft cavity causes especially the thinner areas of the hollow shaft to be spread widely outwards in the radial direction. In this way, the spread-out shaft area reaches an extent which corresponds to the diameter of the semi-hollow rivet. This radial spreading is also supported by the material of the semi-hollow rivet, which consists of light metal, such as aluminum.

Joints made of high-strength steels are, according to DE 10 2013 020 504 A1, produced with a self-piercing rivet, the shaft of which has an axial recess of small axial depth at the end opposite to the rivet head. Compared to the length of the self-piercing rivet, the axial depth of the shaft bore or the axial recess is less than 30% of the rivet length. In addition, the self-piercing rivet consists of a stable steel material, since the spreading of the rivet shaft is less important in the described riveting method. Due to the relatively small axial depth of the shaft bore it is rather achieved that the self-piercing rivet joint is formed by a compressing process of the self-piercing rivet, which is caused by the counter-pressure of the high-strength steel of the workpiece arrangement. Thus, the self-piercing rivet geometry and joint described here follows a completely different joining system than what is described, for example, in EP 0 833 063 A1.

Despite the variety of joining elements known in the prior art, it is an object of the present invention to provide a semi-hollow self-piercing rivet which is particularly suitable for the manufacturing of joint connections in thin sheet stacks, preferably of light metal. Another object of the present invention is to provide a manufacturing method for such a joint and such a semi-hollow rivet.

3. SUMMARY

The above objects are solved in at least some embodiments by a semi-hollow self-piercing rivet, by a joint with this semi-hollow self-piercing rivet, by a manufacturing method for the self-piercing rivet joint and by a manufacturing method for the above-mentioned semi-hollow self-piercing rivet. Advantageous embodiments and further developments of the present disclosure will become apparent from the following description, the accompanying drawings and the appending claims.

The semi-hollow self-piercing rivet comprises a rivet head and a rivet shaft having a central shaft bore, both having a common central axis X, wherein the rivet shaft has an outer shaft face and an inner shaft face defining the central shaft bore, the shaft bore has a depth $T_B$ and the semi-hollow self-piercing rivet has a total length $L_N$ and meets the following relation:

$$0.35 \leq \frac{T_B}{L_N} \leq 0.65,$$

preferably $$0.4 \leq \frac{T_B}{L_N} \leq 0.6,$$

wherein
the total length of the semi-hollow self-piercing rivet $L_N \leq 4$ mm, the outer shaft face and the inner shaft face in the rivet shaft form a hollow cylindrical section at least over a portion of the rivet shaft.

The geometry of the semi-hollow self-piercing rivet according to the disclosure is in particular adapted to the manufacturing of thin sheet metal joints, i.e. a stack of two or more thin sheets. This adaptation is reflected in particular in a reduction of the total length of the semi-hollow self-piercing rivet as well as in a reduction of the depth of the shaft bore of the semi-hollow self-piercing rivet. Due to the total length $L_N$ of the semi-hollow self-piercing rivet, which is adapted to the thin sheet metal joint, the length of the rivet shaft available for the spreading after piercing the thin sheets is reduced. In addition to this, the adapted depth $T_B$ of the shaft bore also causes a particular spreading behavior of the end of the rivet shaft opposite to the head. This ensures that damage to the material of the semi-hollow self-piercing rivets as well as to the material of at least one of the thin sheets, which may be all thin sheets, is largely avoided in the produced joint, in addition to a reliable attachment of the semi-hollow self-piercing rivets in the thin sheet stack and a reliable attachment of the plurality of thin sheets to each other.

According to an embodiment of the present disclosure, the cylindrical outer shaft face extends at least to the depth $T_B$ of the shaft bore with a constant diameter in the direction of the rivet head. According to a further embodiment of the self-piercing rivet, the cylindrical outer shaft face extends beyond the depth $T_B$ of the shaft bore with a constant diameter in the direction of the rivet head. These geometrical configurations have the advantage that a transition between the cylindrical outer side of the rivet shaft and the rivet head is displaced in the direction of the rivet head. The countersunk-shaped rivet head may transition via a chamfer or an arc having a countersunk radius into the cylindrical outer side of the rivet shaft. With the help of this embodiment, the radial widening of the rivet shaft and thus the mechanical load of the components to be joined or thin sheets begins independently from a widening or spreading of the rivet shaft only with an increasing penetration depth of the self-piercing rivet into the thin sheet stack, thus later with respect to the course of joining the self-piercing rivet in a thin sheet stack. As a result, the components to be joined can be mechanically relieved and thus the self-piercing rivet connection to be established is made more reliable.

According to an embodiment of the present disclosure, a diameter $D_K$ of the rivet head and a diameter $D_S$ of the rivet shaft meet the following relation:

$$1.35 \le \frac{D_K}{D_S} \le 1.75.$$

Also with regard to the above-discussed spreading behavior of the semi-hollow self-piercing rivets, the diameter $D_S$ of the rivet shaft is adapted to the diameter $D_K$ of the rivet head. If the relation between the mentioned diameters is met, the rivet shaft is spread to an essential lower radial extend than the rivet head in regard to its diameter $D_K$ during the joining process.

According to another embodiment, the cylindrical outer shaft face and the inner shaft face are connected radially outwards by a radially inwardly inclined chamfer and radially inwards by a radially inner radius to form a cutting edge. Because of this geometry, the cutting edge of the semi-hollow self-piercing rivet achieves a circle of minimum line width as a punching surface, in contrast to annular punching surfaces of known semi-hollow self-piercing rivets. This engagement of the cutting edge in an almost selective surface segment respectively below the cutting edge generates a concentration of the acting mechanical load during the joining process and thus supports the penetration of the semi-hollow self-piercing rivet in the thin sheet layers. In addition, the cutting edge area initiated by the cutting edge is annular over the length of the shaft bore. This is supported especially by the cylindrical outer shaft face.

The semi-hollow self-piercing rivet may consist of steel or a steel alloy. According to another embodiment of the semi-hollow self-piercing rivet, the cylindrical outer shaft face transitions above the depth of the shaft bore via a circular arc with a countersunk radius or over a chamfer into the rivet head. This special design refers to the displacement behavior of the material of the thin sheet stack during the joining process, wherein both embodiments have different advantages.

A further advantageous embodiment of the present disclosure describes a semi-hollow self-piercing rivet having the following dimensions: rivet length $L_N=3$ mm±0.1 mm, depth of shaft bore $T_B=1.5$ mm±0.1 mm, countersunk radius $R_S=1.3$ mm±0.15 mm and a cylindrical outer shaft face which extends beyond the depth of the shaft bore with constant diameter in the direction of the rivet head. According to a further embodiment, the semi-hollow self-piercing rivet has the following dimensions: rivet length $L_N=3$ mm±0.1 mm, depth of the shaft bore $T_B=1.5$ mm±0.1 mm, a cylindrical outer shaft face which extends beyond the depth of the shaft bore with constant diameter in the direction of the rivet head, which may be over a length $L_S$ from the rivet foot of $T_B \le L_S \le 3/2 \times T_B$ and an lower head chamfer, with which the cylindrical outer shaft face transitions at an angle of 30°±2° between chamfer and upper head side into the rivet head.

According to another embodiment, the semi-hollow self-piercing rivet has the following dimensions: rivet length $L_N=3.5$ mm±0.1 mm, depth of shaft bore $T_B=2$ mm±0.1 mm, countersunk radius $R_S=1.4$ mm 0.15 mm and a cylindrical outer face which extends beyond the depth of the shaft bore with a constant diameter in the direction of the rivet head. According to another geometry of the semi-hollow self-piercing rivet, the latter has the following dimensions: rivet length $L_N=3.5$ mm±0.1 mm, depth of the shaft bore $T_B=2$ mm±0.1 mm, a cylindrical outer shaft face which extends beyond the depth of the shaft bore with a constant diameter in the direction of the rivet head, which may be over a length $L_S$ from the rivet foot of $T_B \le L_S \le 3/2 \times T_B$ and a lower head chamfer, with which the cylindrical outer shaft face transitions at an angle of 30°±2° between chamfer and upper head side into the rivet head or a cylindrical outer side of the rivet head.

In addition, it may be preferred to allow the semi-hollow self-piercing rivet with a rivet length of $L_N=3$ mm to transition into the cutting edge on its inner shaft face via a circular arc having a radius $R_i=0.65$ mm±0.4 mm. With reference to a semi-hollow self-piercing rivet with a rivet length $L_N=3.5$ mm, it may be preferred to allow the inner shaft face to transition into the cutting edge over a circular arc having a radius $R_i=1.5$ mm±0.4 mm.

The present disclosure additionally comprises a joint of at least one first component and a second component with a semi-hollow self-piercing rivet, wherein the components may have a total thickness $T_{Gesamt} \le 1.9$ mm, a cover layer of harder material facing the rivet head consists of at least one base layer facing away from the rivet head and the base layer is formed thicker than the cover layer in the direction of the longitudinal axis of the semi-hollow self-piercing rivet, wherein a spread out rivet shaft with a diameter $D_S$ in relation to a diameter $D_K$ of the rivet head meets the following relation:

$$\frac{D_K}{D_S} \geq 1.11,$$

preferably $$\frac{D_K}{D_S} \geq 1.15,$$

and more preferably $$\frac{D_K}{D_S} \geq 1.25.$$

The present disclosure has recognized that, in the production of thin sheet metal joints, which consist of two or more thin sheets, the life span of the produced joint connection can be adversely affected by the spreading behavior of the used semi-hollow self-piercing rivet. For a reliable connection, it was thus recognized as an essential criterion that the shaft of semi-hollow self-piercing rivets may only be spread so far in a radial direction during the joining process that it achieves not more than 90%, in some embodiments not more than 87% and in some embodiments not more than 80% of the radial extent of the diameter $D_K$ of the rivet head.

According to the present disclosure, the semi-hollow self-piercing rivet and the cover layer may be made of steel or a steel alloy. The base layer present in the thin sheet stack may be made of aluminum, an aluminum alloy, a light metal, a light metal alloy or a similar material that has similar material properties. Moreover, in view of a reliable joint, the semi-hollow self-piercing rivet in the joint may completely pierce-through the cover layer. In this way, a more reliable joint can be achieved.

Furthermore, the present disclosure describes a manufacturing method for a self-piercing rivet joint in a cover layer of a first material and in at least one base layer of a second material, wherein the first material is harder than the second material, while the method comprises the following steps: joining a semi-hollow self-piercing rivet in the cover layer and the at least one base layer and spread out a rivet shaft of the semi-hollow self-piercing rivet with central shaft bore during the joining process, so that a spread out rivet shaft having a diameter $D_S$ in relation to a diameter $D_K$ of a rivet head meets the following relation:

$$\frac{D_K}{D_S} \geq 1.25.$$

Further, within the scope of the manufacturing method for the self-piercing rivet joint, it is preferable that the semi-hollow self-piercing rivet and the cover layer are made of steel or a steel alloy, while the at least one base layer is made of aluminum, an aluminum alloy, similar soft materials or other light metals or light metal alloys. Moreover, in view of a reliable joint, the semi-hollow self-piercing rivet may completely pierce-through the cover layer during the manufacture of the connection, that is during the joining of the semi-hollow self-piercing rivet into the thin sheet stack.

The present disclosure also discloses a manufacturing method for a semi-hollow self-piercing rivet comprising the following steps: cold-forming a wire blank into a semi-hollow self-piercing rivet with a rivet head and a rivet shaft with a central shaft bore, both having a common central axis X, wherein the rivet shaft comprises an outer shaft face and an inner shaft face limiting the central shaft bore, the central shaft bore has a depth $T_B$ and the semi-hollow self-piercing rivet has a total length $L_N$ and meets the following relation:

$$0.35 \leq \frac{T_B}{L_N} \leq 0.65,$$

preferably $$0.4 \leq \frac{T_B}{L_N} \leq 0.6,$$

wherein
the total length of the self-piercing rivet $L_N \leq 4$ mm, the outer shaft face and the inner shaft face in the rivet shaft form a hollow cylindrical section and the cylindrical outer shaft face extends at least to the depth $T_B$ of the shaft bore with a constant diameter in the direction of the rivet head.

4. BRIEF DESCRIPTION OF THE ACCOMPANYING DRAWINGS

Figure 2:
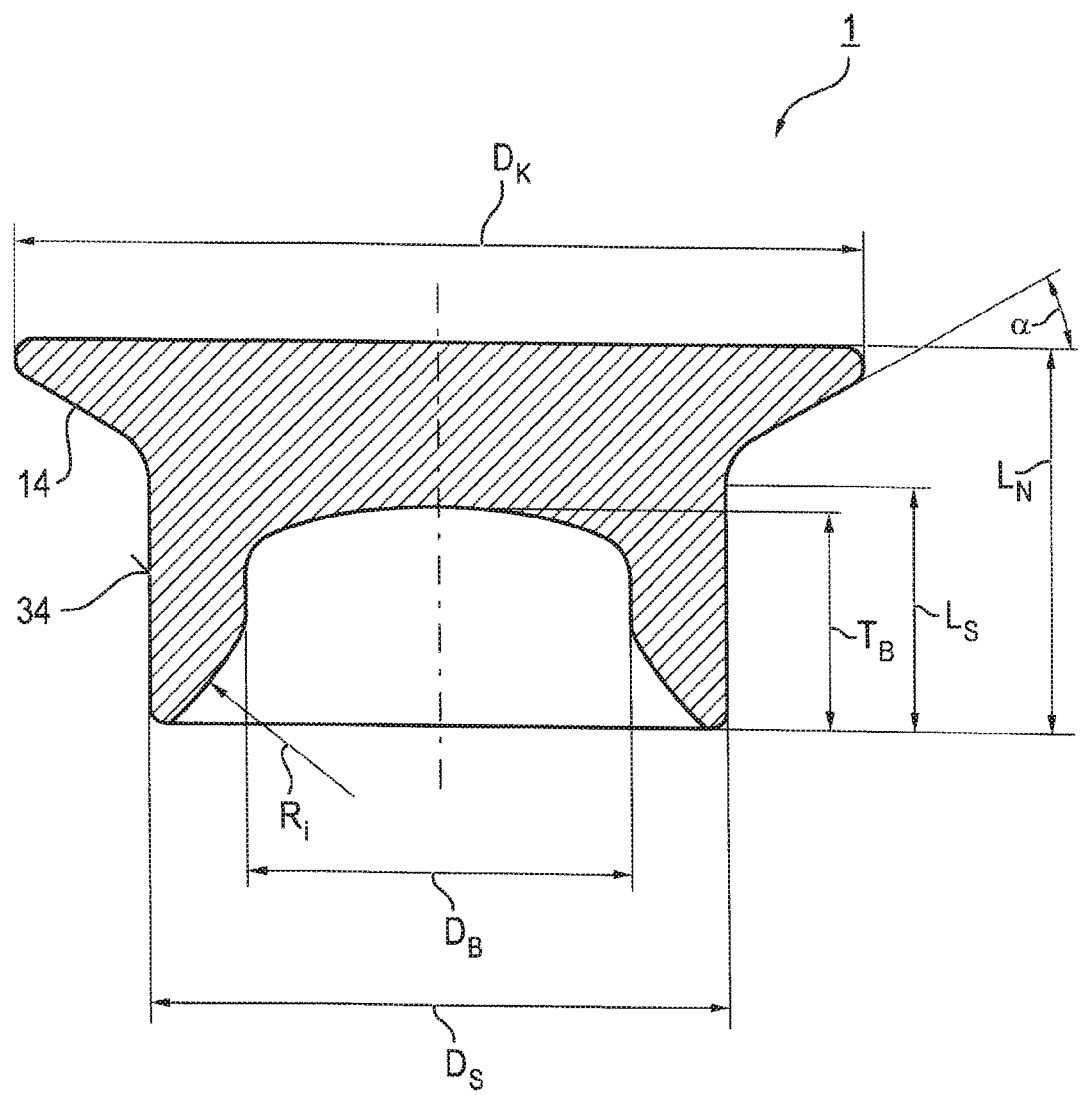
Figure 3A:
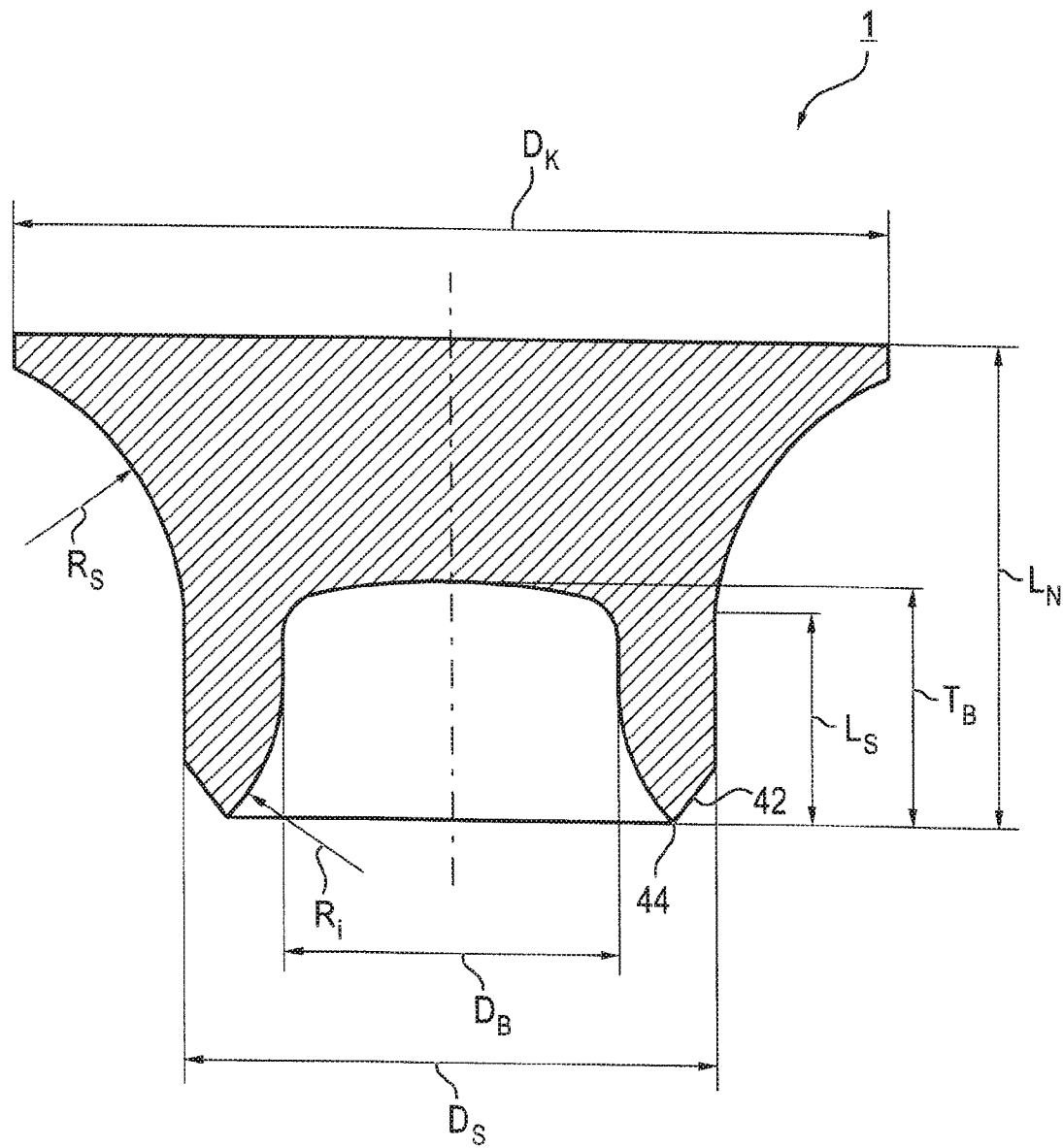
Figure 3B:
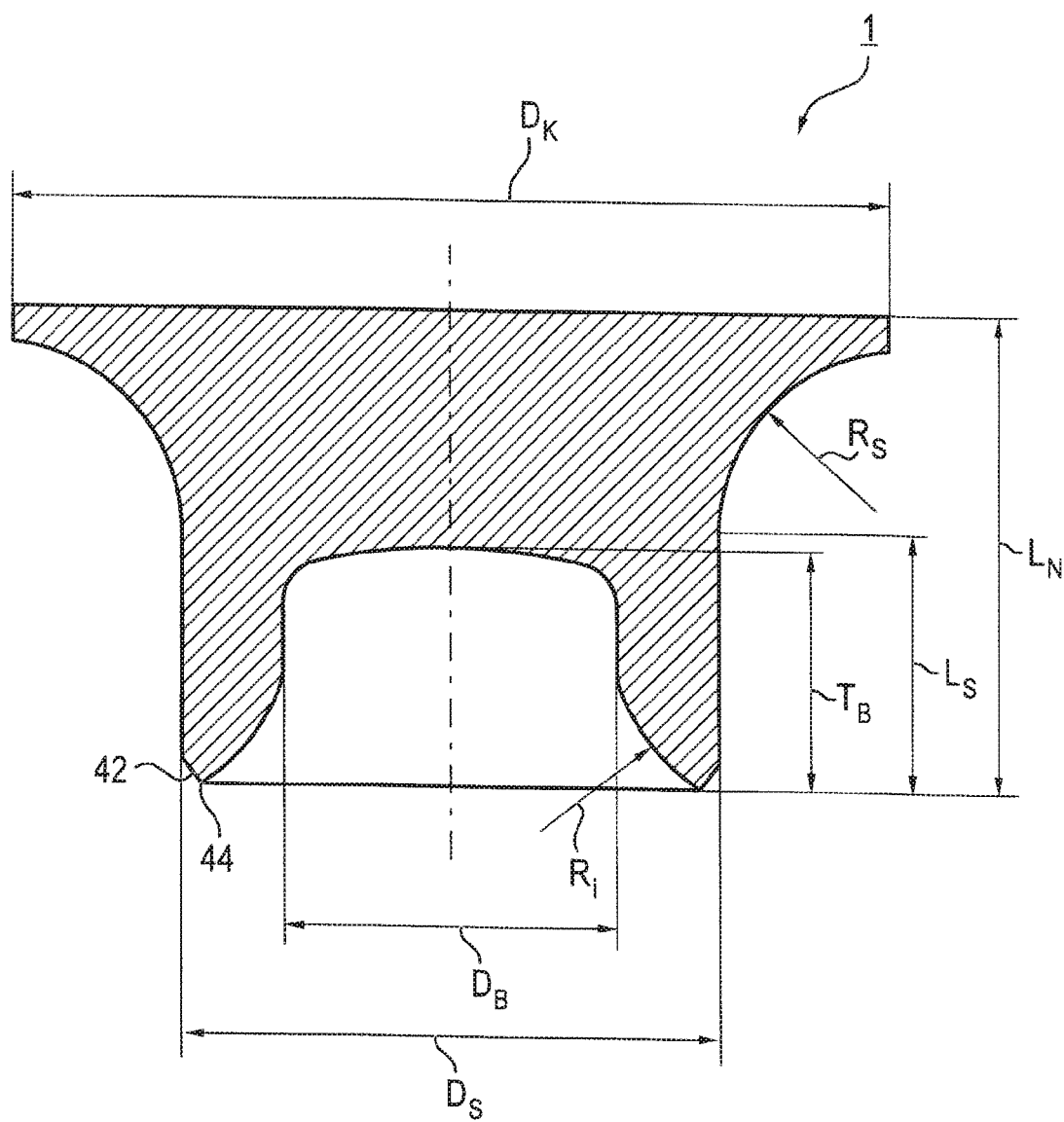
Figure 4:
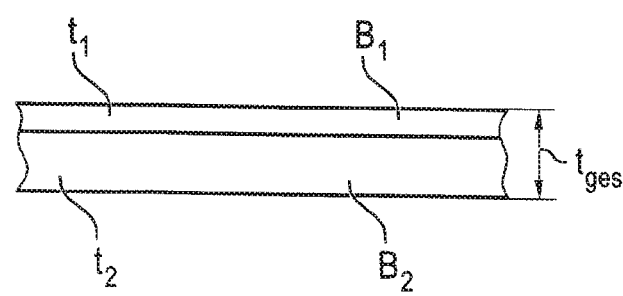
Figure 5A:
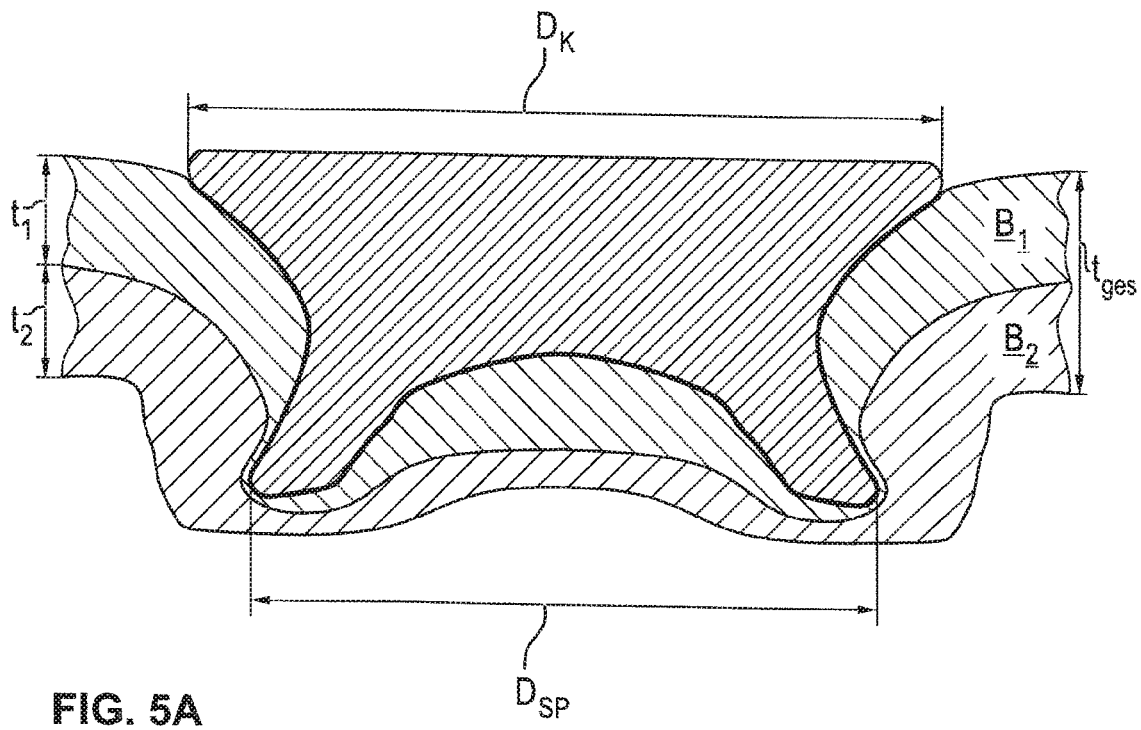
Figure 5B:
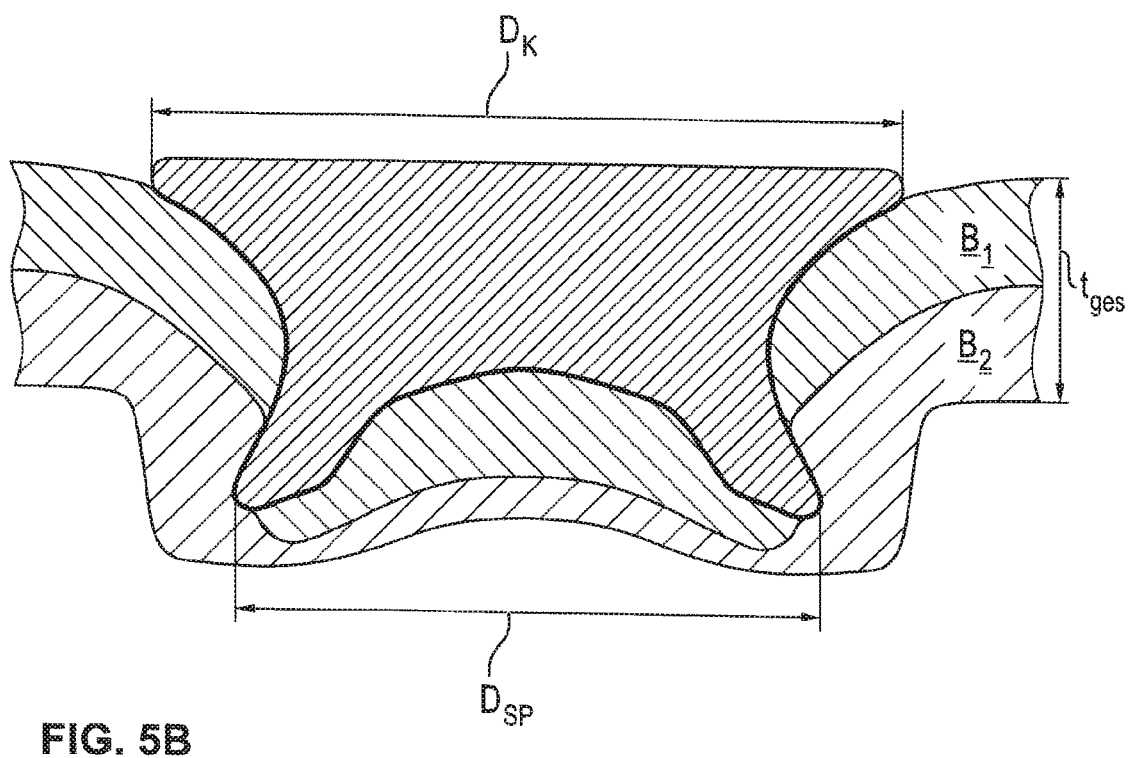
Figure 6:
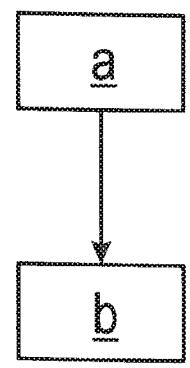

Representative embodiments of the present disclosure will be explained in more detail with reference to the accompanying drawings. It shows:

FIG. 1 is a sectional view of an embodiment of the semi-hollow self-piercing rivet with a countersunk head, which transitions via a curved outer face into the rivet shaft, FIG. 2 is a sectional view of an embodiment of the semi-hollow self-piercing rivet with a countersunk head, which transitions via a chamfer into the rivet shaft, FIG. 3A is a sectional view of an embodiment of the semi-hollow self-piercing rivet with a countersunk head having its cylindrical outer side of the rivet shaft extending below the depth of the shaft bore, FIG. 3B is a sectional view of a further embodiment of the semi-hollow self-piercing rivet according with a countersunk head having its cylindrical outer side of the rivet shaft extending up to above the depth of the shaft bore in the direction of the rivet head, FIG. 4 is a schematic component arrangement for joining the semi-hollow self-piercing rivet, FIG. 5A is a self-piercing rivet joint of two components with the aid of the semi-hollow self-piercing rivet in which the cover layer is not pierced through by the semi-hollow self-piercing rivet, FIG. 5B is a self-piercing rivet joint of two components with the aid of the semi-hollow self-piercing rivet in which the cover layer is completely pierced through by the semi-hollow self-piercing rivet, and FIG. 6 is a flow chart of an embodiment for producing self-piercing rivet joint with the aid of the semi-hollow self-piercing rivet.

5. DETAILED DESCRIPTION

The semi-hollow self-piercing rivet 1 according to the disclosure is produced from a wire blank by means of a cold-forming method. It has the geometric features discussed below. As shown by the embodiments of the semi-hollow self-piercing rivet 1 illustrated in FIGS. 1 to 3, the latter comprises a rivet head 10 and a rivet shaft 30 with a central shaft bore 32 having a common central axis X. The rivet shaft 30 has an outer shaft face 34 and an inner shaft face 36 limiting the central shaft bore 32. The shaft bore 30 has a depth $T_B$ and the semi-hollow self-piercing rivet 1 has a total length $L_N$. The semi-hollow self-piercing rivet according to the disclosure may be used for producing a self-piercing rivet joint in a stack of a plurality of thin sheets $B_1, B_2 \ldots$ (see FIG. 4), which have the thicknesses $t_1$ and $t_2$. For this purpose, the semi-hollow self-piercing rivet 1 has the total length of $L_N \leq 4$ mm, wherein the outer shaft face 34 and the inner shaft face 36 in the rivet shaft 30 form a hollow cylindrical section 38. In order to achieve a reliable joint of the sheets $B_1, B_2$, the cylindrical outer shaft face 34 extends at least over a portion of the rivet shaft having a constant diameter in direction of the rivet head.

According to an embodiment of the semi-hollow self-piercing rivet, the cylindrical outer shaft face 34 maximally extends to the depth $T_B$ of the shaft bore 32 with a constant shaft diameter $D_S$ in direction of the rivet head 10 (see FIG. 3A). According to a further embodiment of the semi-hollow self-piercing rivet, the cylindrical outer shaft face 34 may extend beyond the depth $T_B$ of the shaft bore 32 with a constant shaft diameter $D_S$ in direction of the rivet head 10 (see FIG. 3B).

In addition, the geometric properties of the semi-hollow self-piercing rivet 1 may meet following relation:

$$0.35 \leq \frac{T_B}{L_N} \leq 0.65,$$

in some embodiments $$0.4 \leq \frac{T_B}{L_N} \leq 0.6.$$

The combination of a relatively short semi-hollow rivet 1 and the shaft bore 32 with a small depth $T_B$ has been found to be beneficial for achieving a durable thin sheet metal joint in the at least two sheets $B_1, B_2$.

In the thin sheet metal joint, a cover layer $D_1$ facing the rivet head 10 of the thin sheet metal joint may consist of a harder material than the at least one base layer $B_2$ arranged underneath. The cover layer $B_1$ may be made of steel, a steel alloy or similar materials. The base layer $B_2$, however, consists of a light metal or a light metal alloy, such as aluminum, an aluminum alloy or similar materials.

According to an embodiment of the present disclosure, the at least one base layer $B_2$ of the thickness $t_2$ is thicker than the cover layer $B_1$ of the thickness $t_1$. For the thicknesses $t_1, t_2$ of cover layer $B_1$ and base layer $B_2$, in relation to the length $L_N$ of the semi-hollow self-piercing rivet 1 to be connected, it applies:

$$t_1 \leq 0.4 \times L_N$$

$$t_2 \geq 0.7 \times t_1.$$

With regard to the total thickness $t_{Gesamt}$ of the thin sheet stack, which is the sum of the thicknesses $t_1, t_2$ of the cover layer $B_1$ and the at least one base layer $B_2$, in at least some embodiments it preferably applies $$t_{Gesamt} = t_1 + t_2 < (1.5 \text{ mm to } 2.0 \text{ mm}), \text{ preferably } t_{Gesamt} < 1.9 \text{ mm}.$$

The base layer $B_2$ or a stack of several base layers $B_2$ is preferably formed considerably thicker than the cover layer $B_1$, with $$t_{2a} + t_{2b} + \ldots = t_2 \geq 1.5 \times t_1.$$

Furthermore, while preferably the diameter $D_K$ of the rivet head 10 and the diameter $D_S$ of the rivet shaft 30 meet the relation $$1.35 \leq \frac{D_K}{D_S} \leq 1.75,$$

the particular spreading behavior of the semi-hollow self-piercing rivet 1 in the thin sheet joint follows, as illustrated in FIG. 5. This spreading behavior is characterized by a limited radially outwardly deformation of the rivet foot 40. The spreading behavior of the semi-hollow self-piercing rivet 1 in the thin sheet joint is characterized by the ratio of the diameter $D_K$ of the rivet head 10 to the maximum diameter $D_{SP}$ of the spread out rivet shaft 30, as shown in FIG. 5. Accordingly, the diameter $D_K$ of the rivet head 10 and the diameter $D_{SP}$ of the spread out rivet shaft 30 meet the following relation:

$$\frac{D_K}{D_{SP}} \geq 1.11,$$

preferably $$\frac{D_K}{D_{SP}} \geq 1.15$$

and more preferably $$\frac{D_K}{D_{SP}} \geq 1.25.$$

The ratio of the diameter $D_K$ of the rivet head 10 to the diameter $D_{SP}$ of the spread out rivet shaft 30 is illustrated in FIGS. 5A and 5B. As it can be seen from FIG. 5A, in this joint, the cover layer $B_1$ with the thickness $t_1$ is not pierced through. Nevertheless, the spread out rivet shaft 30 with the deformed layers $B_1$ and $B_2$ forms a sufficient undercut for a reliable joint. According to a further embodiment, the joint according to FIG. 5B may comprise a completely pierced through cover layer $B_1$. In this case, the spread out rivet shaft 30 anchors in the softer base layer $B_2$ or the softer base layers in comparison to the cover layer $B_1$.

While the semi-hollow self-piercing rivet 1 may be made of steel, a steel alloy or a similar material, the spreading behavior is, according to another embodiment of the present disclosure, supported by the geometry of the rivet foot 40. Correspondingly, the cylindrical outer shaft face 34 and the inner shaft face 36 are connected to each other radially outwards by a radially inwardly inclined chamfer 42 and radially inwards by a circular arc having a radius via a cutting edge 44 (see FIG. 3).

In order to support the setting of the semi-hollow self-piercing rivet 1 in the sheet stack $B_1, B_2$ and to achieve a reliable joint, according to the above-mentioned embodiment of the rivet shaft 30, its cylindrical outer shaft face 34 and thus a cylindrical cutting portion of the rivet shaft extends over a distance $L_S$ starting at the end of the semi-hollow self-piercing rivet 1 facing away from the head. In particular, the cylindrical outer shaft face 34 extends in direction of rivet head 10 with a constant diameter $D_S$ up to or beyond the depth $T_B$ of the shaft bore 32 in direction of rivet head 10. This shaft geometry has a positive effect on the mechanical load of the rivet shaft 30 during the joining process. The length $L_S$ of the cylindrical outer shaft face 34 may have a size if measured from the rivet foot 40 of $$T_B \le L_S \le \frac{3}{2} \times T_B$$

with respect to the above second alternative.

According to a further embodiment, the rivet head 10 transitions into the cylindrical outer shaft face 34 in a circular arc 12 having the radius $R_S$. Due to this design, the material of the cover layer $B_1$ may attach to the circular arc 12 during the manufacturing of the joining without forming voids in the transition area between the semi-hollow self-piercing rivet 1 and the material of the cover layer $B_1$ (see FIG. 1).

A further embodiment of the semi-hollow self-piercing rivet 1 is shown in FIG. 2. Here, the rivet head 10 transitions into the cylindrical outer shaft face 34 via a chamfer 14 running at least partially linearly. The chamfer 14 may be arranged at an angle $\alpha$ equal to 30°±2° with respect to the upper side of the rivet head 10. During the joining process of the semi-hollow self-piercing rivet 1, the face below the chamfer 14, therefore facing away from the rivet head 10, compresses the material of the cover layer $B_1$, while the rivet shaft 30 is spread out. After the joining process, the rivet head 10 and thus the compressed material below the chamfer 14 is relieved and relaxed, while at the same time the spread out rivet shaft 30 anchors the semi-hollow self-piercing rivet 1 in the material. The resulting compressive stress in the sheet stack has a positive effect on the self-piercing rivet joint, especially when brittle materials are used as cover layer $B_1$.

In addition to the functional-geometric configurations of the above-described semi-hollow self-piercing rivet 1, which can be fully or partially realized in the geometry of the semi-hollow self-piercing rivet 1, an embodiment of the semi-hollow self-piercing rivet has the following dimensions:
rivet length $L_N$=3 mm±0.1 mm,
depth of the shaft bore $T_B$=1.5 mm±0.1 mm,
countersunk radius $R_S$=1.3 mm±0.15 mm,
wherein a cylindrical outer shaft face, which extends with a constant diameter beyond the depth of the shaft bore in direction of the rivet head, has the length $L_S$ from the rivet foot with $T_B \le L_S \le 3/2 \times T_B$. Furthermore, in at least some embodiments it is preferred that the inner shaft face 36 transitions with the radius $R_i$=0.65 mm±0.4 mm into the cutting edge 44.

A further embodiment of the semi-hollow self-piercing rivet 1 has the following dimensions:
rivet length $L_N$=3 mm±0.1 mm,
depth of the shaft bore $T_B$=1.5 mm±0.1 mm,
the cylindrical outer shaft face, extending with the constant diameter $D_S$ beyond the depth $T_B$ of the shaft bore 32 in direction of the rivet head 10, over a length $L_S$ from the rivet foot 40 of $T_B \le L_S \le 3/2 \times T_B$ and a lower head chamfer with which the cylindrical outer shaft face 34 transitions at an angle $\alpha$ of 30°±2° between chamfer 14 and upper side of the rivet head 10 into the rivet head 10. The inner shaft face 36 may transition with the radius $R_i$=0.65 mm±0.4 mm into the cutting edge 44.

A further embodiment of the self-piercing rivet 1 according to the disclosure has the following dimensions:
rivet length $L_N$=3.5 mm±0.1 mm,
depth of the shaft bore 32 $T_B$=2 mm±0.1 mm,
countersunk radius $R_S$=1.4 mm±0.15 mm,
with which the circular arc 12 transitions from the cylindrical outer shaft face 34 into the rivet head 10, and the cylindrical outer shaft face, which extends with the constant diameter $D_S$ beyond the depth $T_B$ of the shaft bore 32 in direction of the rivet head according to $T_B \le L_S \le 3/2 \times T_B$. Furthermore, it is the inner shaft face 36 may transition over the radius $R_i$=1.5 mm±0.4 mm into the cutting edge 44.

According to a further embodiment of the semi-hollow self-piercing rivet 1, the following dimensions are used:
rivet length $L_N$=3.5 mm±0.1 mm,
depth of the shaft bore 32 $T_B$=2 mm±0.1 mm,
the cylindrical outer shaft face 34 extending with the constant diameter $D_S$ beyond the depth $T_B$ of the shaft bore 32 in direction of the rivet head 10 according to $T_B \le L_S \le 3/2 \times T_B$ and the lower head chamfer 14, with which the cylindrical outer shaft face 34 transitions at an angle $\alpha$ of 30°±2° between the chamfer 14 and upper side of the rivet head 10 into the rivet head 10. The inner shaft face 36 may transition via a circular arc having the radius $R_i$=1.5 mm 0.4 mm into the cutting edge 44.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. Semi-hollow self-piercing rivet with a rivet head and a rivet shaft having a central shaft bore, both having a common central axis X, wherein the rivet shaft has an outer shaft face and an inner shaft face limiting the central shaft bore, the shaft bore having a depth $T_B$ and the semi-hollow self-piercing rivet having a total length $L_N$ and meeting the following relation:

$$0.35 \le \frac{T_B}{L_N} \le 0.65,$$

preferably $$0.4 \le \frac{T_B}{L_N} \le 0.6,$$

wherein
the total length of the semi-hollow self-piercing rivet $L_N \le 4$ mm, the outer shaft face and the inner shaft face in the rivet shaft form a hollow cylindrical section at least over a portion of the rivet shaft.

2. Semi-hollow self-piercing rivet according to claim 1, in which the cylindrical outer shaft face maximally extends to the depth $T_B$ of the shaft bore with a constant diameter in direction of the rivet head.

3. Semi-hollow self-piercing rivet according to claim 2, in which a diameter $D_K$ of the rivet head and a diameter $D_S$ of the rivet shaft meet the following relation:

$$1.35 \leq \frac{D_K}{D_S} \leq 1.75.$$

4. Semi-hollow self-piercing rivet according to claim 2, in which the cylindrical outer shaft face and the inner shaft face are connected with each other radially outwards by a radially inwardly inclined chamfer and radially inwards by a radially inner radius to form a cutting edge.

5. Semi-hollow self-piercing rivet according to claim 2 consisting of steel or a steel alloy.

6. Semi-hollow self-piercing rivet according to claim 2, the cylindrical outer shaft face of which transitions via a countersunk radius or via a chamfer into the rivet head.

7. Semi-hollow self-piercing rivet according to claim 1, in which the cylindrical outer shaft face extends beyond the depth $T_B$ of the shaft bore with a constant diameter in direction of the rivet head.

8. Semi-hollow self-piercing rivet according to claim 7, having the following dimensions:
rivet length $L_N$=3 mm±0.1 mm,
depth of the shaft bore $T_B$=1.5 mm±0.1 mm,
countersunk radius $R_S$=1.3 mm±0.15 mm,
and a cylindrical outer shaft face, which extends with a constant diameter beyond the depth of the shaft bore in direction of the rivet head.

9. Semi-hollow self-piercing rivet according to claim 8, in which the cylindrical outer shaft face and the inner shaft face are connected with each other radially outwards by a radially inwardly inclined chamfer and radially inwards by a radially inner radius to form a cutting edge, and the inner shaft face of which transitions with a radius $R_i$=0.65 mm±0.4 mm into the cutting edge.

10. Semi-hollow self-piercing rivet according to claim 7, having the following dimensions:
rivet length $L_N$=3 mm±0.1 mm,
depth of the shaft bore $T_B$=1.5 mm±0.1 mm,
a cylindrical outer shaft face, extending with a constant diameter beyond the depth of the shaft bore in direction of the rivet head, and
a lower head chamfer, with which the cylindrical outer shaft face transitions at an angle α of 30°±2° between the chamfer and the upper head side into the rivet head.

11. Semi-hollow self-piercing rivet according to claim 10, in which the cylindrical outer shaft face and the inner shaft face are connected with each other radially outwards by a radially inwardly inclined chamfer and radially inwards by a radially inner radius to form a cutting edge, and the inner shaft face of which transitions with a radius $R_1$=0.65 mm±0.4 mm into the cutting edge.

12. Semi-hollow self-piercing rivet according to claim 7, which has the following dimensions:
rivet length $L_N$=3.5 mm±0.1 mm,
depth of the shaft bore $T_B$=2 mm±0.1 mm,
countersunk radius $R_S$=1.4 mm±0.15 mm,
and a cylindrical outer shaft face, which extends with a constant diameter beyond the depth of the shaft bore in direction of the rivet head.

13. Semi-hollow self-piercing rivet according to claim 12, in which the cylindrical outer shaft face and the inner shaft face are connected with each other radially outwards by a radially inwardly inclined chamfer and radially inwards by a radially inner radius to form a cutting edge, and the inner shaft face of which transitions with a radius $R_i$=1.5 mm±0.4 mm into the cutting edge.

14. Semi-hollow self-piercing rivet according to claim 7, which has the following dimensions:
rivet length $L_N$=3.5 mm±0.1 mm,
depth of the shaft bore $T_B$=2 mm±0.1 mm,
a cylindrical outer shaft face extending with a constant diameter beyond the depth of the shaft bore in direction of the rivet head, and,
a lower head chamfer, with which the cylindrical outer shaft face transitions at an angle α of 30°±2° between the chamfer and the upper head side into the rivet head.

15. Semi-hollow self-piercing rivet according to claim 14, in which the cylindrical outer shaft face and the inner shaft face are connected with each other radially outwards by a radially inwardly inclined chamfer and radially inwards by a radially inner radius to form a cutting edge, and the inner shaft face of which transitions with a radius $R_i$=1.5 mm±0.4 mm into the cutting edge.

16. Semi-hollow self-piercing rivet according to claim 7, in which a diameter $D_K$ of the rivet head and a diameter $D_S$ of the rivet shaft meet the following relation:

$$1.35 \leq \frac{D_K}{D_S} \leq 1.75.$$

17. Semi-hollow self-piercing rivet according to claim 7, in which the cylindrical outer shaft face and the inner shaft face are connected with each other radially outwards by a radially inwardly inclined chamfer and radially inwards by a radially inner radius to form a cutting edge.

18. Semi-hollow self-piercing rivet according to claim 7 consisting of steel or a steel alloy.

19. Semi-hollow self-piercing rivet according to claim 7, the cylindrical outer shaft face of which transitions via a countersunk radius or via a chamfer into the rivet head.

20. Joint of at least a first component and a second component with a semi-hollow self-piercing rivet, wherein the components have a total thickness $T_G$<1.9 mm, a cover layer facing the rivet head is made of harder material than a base layer facing away from the rivet head and the base layer in the direction of the longitudinal axis of the semi-hollow self-piercing rivet, which is thicker than the cover layer, wherein a spread out rivet shaft having a diameter $D_{SP}$ in relation to a diameter of the rivet head $D_K$ meets the following relation:

$$\frac{D_K}{D_{SP}} \geq 1.11,$$

preferably $$\frac{D_K}{D_{SP}} \geq 1.15,$$

and more preferably $$\frac{D_K}{D_{SP}} \geq 1.25.$$

21. Joint according to claim 20, in which the semi-hollow self-piercing rivet and the cover layer are made of steel or a steel alloy and the base layer is made of aluminum, an aluminum alloy, light metal, a light metal alloy or a material of similar material properties.

22. Joint according to claim 20, in which the cover layer is pierced through by the rivet shaft.

\* \* \* \* \*